United States Patent [19]
Howard

[11] Patent Number: 6,140,843
[45] Date of Patent: Oct. 31, 2000

[54] CONDITIONAL INVERT FUNCTIONS IN PRECHARGED CIRCUITS

[75] Inventor: David William Howard, Cherry Hinton, United Kingdom

[73] Assignee: ARM Limited, Cambridge, United Kingdom

[21] Appl. No.: 09/136,842

[22] Filed: Aug. 20, 1998

[30] Foreign Application Priority Data

Apr. 17, 1998 [GB] United Kingdom .................. 9808267

[51] Int. Cl.[7] ................................................. H03K 19/00
[52] U.S. Cl. ................................ 326/93; 326/119; 326/98
[58] Field of Search ................................. 326/93, 95, 98, 326/119, 112, 121; 307/407, 408

[56] References Cited

U.S. PATENT DOCUMENTS 5,208,490   5/1993   Yetter .
5,291,076   3/1994   Bridges et al. ........................ 307/449
5,825,208   10/1998  Levy et al. ................................ 326/98

*Primary Examiner*—Michael Tokar
*Assistant Examiner*—Anh Tran
*Attorney, Agent, or Firm*—Nixon & Vanderhye P.C.

[57] ABSTRACT

The present invention provides a data processing apparatus comprising a precharged circuit having at least one input line arranged to be precharged to a first logic value during a precharge phase, and a conditional-invert circuit connected to a first at least one input line and arranged to provide a first data value or the inverted first data value on the first input line during an active phase following the precharge phase. The conditional-invert circuit comprises a signal line coupled to the first input line and arranged to be precharged to a predetermined logic value during the precharge phase, a first set of logic gates connected between the signal line and a predetermined voltage, and being arranged upon receipt of a select signal to cause the first data value to be provided on the first input line, and a second set of logic gates connected between the signal line and the predetermined voltage, and being arranged upon receipt of a select signal to cause the inverted first data value to be provided on the first input line. In the active phase, either the first set of logic gates or the second set of logic gates is arranged to receive the select signal. In accordance with the present invention, the speed benefits of using a precharged circuit as opposed to a non-precharged circuit can be realised in circuitry that also requires a conditional-invert function.

15 Claims, 4 Drawing Sheets

CONDITIONAL INVERT FUNCTIONS IN PRECHARGED CIRCUITS

BACKGROUND OF THE INVENTION

1. Field of the Invention

The present invention relates to a data processing apparatus comprising a precharged circuit, and in particular to techniques for providing a conditional-invert function for a precharged circuit of a data processing apparatus.

2. Description of the Prior Art

Circuits employing precharged circuits have a precharge phase, in which the input(s) and output(s) of each precharged circuit are generally driven to a predetermined logic value. When designing data processing apparatus having one or more precharged circuits, it is well-known that significant attention needs to be paid to the inputs to each precharged circuit, since these inputs must only transition from the predetermined logic value to the other logic value when the precharged circuit is enabled, i.e. when the precharged circuit is not in its precharge phase.

For example, if the precharged circuit is based on n-type logic, then it is usual for the input(s) and output(s) of the precharged circuit to be driven to a logic "0" value during the precharge phase. Clearly, in this instance, if logic on one of the input lines were to cause that input to transition from logic "0" to logic "1" during the precharge phase, then this will adversely affect the precharging of the precharged circuit, in that the precharged circuit may not be in the intended state when the precharge phase is exited. Indeed, such a change at the input may cause the output of the precharged circuit to also transition from a logic "0" to a logic "1" value.

This problem becomes particularly acute when a number of such precharged circuits are connected in series to form domino logic. When precharging such domino logic, all of the precharged circuits are preferably precharged at the same time such that the output of each precharged circuit is driven to the same logic value, e.g. a logic "0" value for n-type precharged circuits. Clearly, if one of the inputs to a precharged circuit transitions during the precharge phase, the effect of this is likely to ripple through all of the precharged circuits forming the domino logic, the result of this being that the domino logic is unlikely to be in the intended state when the precharge phase is exited, and so is unlikely to operate in the correct manner on entering the active phase in which the precharged circuits are enabled.

This problem is discussed on page 309 of the publication entitled "Principles of CMOS VLSI Design" by Weste and Estraghian, Second Edition, published by Addison Wesley, where it is stated that, due to the above mentioned problems, it is important to ensure that only non-inverting logic is included within the domino logic. This makes such precharged circuitry incompatible with exclusive-OR (XOR) functions, which can be either inverting or non-inverting, and hence would introduce uncertainty into the state achieved as a result of the precharge phase of any precharged circuit receiving at one of its inputs the output of such an XOR function.

Despite the above limitations, it is often preferable to use precharged circuits, since they are typically significantly faster than non-precharged circuits. Hence, in principle, it is preferable to use precharged circuits to form circuitry such as fast adders, such as are used in the Arithmetic Logic Unit (ALU) of a microprocessor. However, such an ALU will often include a conditional-invert function on one of the inputs to the adder logic, in order to implement "subtract" functions as well as "add" functions.

Given the requirement for a conditional-invert function within a typical ALU, then one prior art approach has been to use a non-precharged adder circuit instead of a precharged adder circuit, despite the reduction in speed that results from the use of a non-precharged adder circuit. Such an arrangement is illustrated in FIG. 1. As illustrated in FIG. 1, the non-precharged adder circuit 100 has two inputs (A and B). One input value, Bdata, is provided over line 110 to input B, whilst a second data value, Adata, is passed over line 125 to the input of an XOR gate 130. The other input of the XOR gate 130 receives an invert A (InvA) signal over path 120. If InvA has a logic "0" value, then Adata is output from the XOR gate 130 over line 105 to input A of the adder circuit 100. However, if InvA has a logic "1" value, then the value of Adata is inverted by the XOR gate 130, and the inverted value is provided over line 105 to input A. The non-precharged adder circuit 100 then performs an "add" function based on the signals received at inputs A and B, and the result is output from the output terminal S over line 115.

Whilst the circuit illustrated in FIG. 1 enables addition and subtraction to be performed, it is a relatively slow circuit, since a non-precharged adder circuit 100 is used. However, if the non-precharged adder circuit is to be replaced by a precharged adder circuit in order to increase speed, then it is essential that certain steps are put in place to ensure that the circuitry operates correctly, despite the presence of the XOR gate 130. A known prior art technique is illustrated in FIG. 2. In FIG. 2, the non-precharged adder circuit 100 is replaced by a precharged adder circuit 200. However, to ensure that the precharged adder circuit 200 is precharged correctly, and that in particular the presence of the XOR gate 130 does not affect the precharged state of the adder circuit 200, it is necessary to provide some self-timed logic 220 to introduce a delay prior to the precharged adder circuit 200 being enabled over path 230. By introducing this delay, it is ensured that the precharged adder circuit 200 remains in its precharge phase until the XOR logic 130 has settled.

Whilst the approach in FIG. 2 can ensure correct operation of the precharged adder circuit 200, it is difficult to implement such a self-timed path reliably, and this problem is compounded if the XOR logic is preceded by another functional unit, such as a barrel shifter. Further, the provision of self-timed logic 220 increases the size of the overall adder circuitry, and also the presence of such a delay impacts on the potential speed advantage to be gained from using the precharged adder 200 rather than the non-precharged adder 100.

It is hence an object of the present invention to provide an improved technique for enabling conditional-invert functions to be employed in association with precharged circuits.

SUMMARY OF THE INVENTION

Viewed from a first aspect, the present invention provides a data processing apparatus comprising: a precharged circuit having at least one input line arranged to be precharged to a first logic value during a precharge phase; a conditional-invert circuit connected to a first said at least one input line and arranged to provide a first data value or the inverted first data value on the first input line during an active phase following the precharge phase, said conditional-invert circuit comprising: a signal line coupled to the first input line and arranged to be precharged to a predetermined logic value during the precharge phase; a first set of logic gates connected between the signal line and a predetermined voltage, and being arranged upon receipt of a select signal to cause the first data value to be provided on the first input line; a second set of logic gates connected between the signal line and the predetermined voltage, and being arranged upon receipt of a select signal to cause the inverted first data value to be provided on the first input line; in the active phase, either the first set of logic gates or the second set of logic gates being arranged to receive the select signal.

In accordance with the present invention, the conditional-invert function associated with an input to a precharged circuit is provided by a conditional-invert circuit comprising first and second sets of logic gates, the first set being arranged upon receipt of a select signal to cause a first data value to be provided on the first input line, and the second set being arranged upon receipt of a select signal to cause the inverted first data value to be provided on the first input line. Both the first and second sets of logic gates are connected between a signal line and a predetermined voltage, and the signal line is in turn coupled to the input line of the precharged circuit. In the active phase, following precharge of the precharged circuit, a select signal is used to activate either the first set of logic gates or the second set of logic gates so as to cause either the first data value or the inverted first data value, respectively, to be provided on the first input line. However, in the absence of such a select signal, neither of the sets of logic gates are activated, and hence neither set of logic gates has any effect on the voltage on either the signal line or the input line of the precharged circuit coupled to that signal line. Thus, in the precharge phase, the input line of the precharged circuit can be precharged to a first logic value reliably without the possibility that the conditional-invert circuit could cause a transition of the logic value on the input to the precharged circuit.

Accordingly, it can be seen that, in accordance with the present invention, the speed benefits of using a precharged circuit can be realised in circuitry that also requires a conditional-invert function, without the requirement for additional delay circuitry.

In preferred embodiments, each set of logic gates comprises two or more logic gates connected in series between the signal line and the predetermined voltage. Preferably, a first logic gate in said first set is arranged to be turned on upon receipt of a first select signal in order to cause the first data value to be provided on the first input line. Further, in preferred embodiments, a second logic gate in said first set is arranged to receive the first data value, and to be turned on dependent on the value of said first data value. Hence, by this approach, once the first logic gate has been turned on upon receipt of the first select signal, then the logic level on the signal line will be dependent on whether the second logic gate is turned on as a result of the first data value. This in turn will determine the logic level on the first input line coupled to the signal line.

Similarly, in preferred embodiments, a first logic gate in said second set is arranged to be turned on upon receipt of a second select signal in order to cause the inverted first data value to be provided on the first input line. Further, preferably, a second logic gate in said second set is arranged to receive the inverted first data value, and to be turned on dependent on the value of said inverted first data value.

It will be apparent to those skilled in the art that the first logic value to which the at least one input line of the precharged circuit is precharged can be either a logic "0" level or a logic "1" level. However, in preferred embodiments, the precharged circuit includes n-type logic, and in this embodiment, the first logic value to which the at least one input line of the precharged circuit is precharged is preferably a logic "0" value.

Further, in preferred embodiments, the logic gates in the first and second sets within the conditional-invert circuit are n-type logic gates.

In this preferred embodiment, the predetermined voltage to which the first and second sets of logic gates are connected is earth, and the signal line is precharged to a logic '1' value, the signal line being coupled to the first input line via an inverter. Since the signal line is precharged to a logic "1" value, the inverter will ensure that the first input line is precharged to a logic "0" value.

The precharged circuit may be any precharged circuit requiring a conditional-invert function to be associated with at least one of its inputs. However, in preferred embodiments the precharged circuit is an adder circuit.

In preferred embodiments, the adder circuit has two input lines, namely the above mentioned first input line and a second input line. The second input line may or may not require a conditional-invert function to be associated with it. However, assuming it does require a conditional-invert function to be associated with it, then in preferred embodiments the data processing apparatus further comprises a second conditional-invert circuit connected to the second input line.

To benefit from the present invention, the data processing apparatus need only have one precharged circuit. However, alternatively, the data processing apparatus may comprise a plurality of precharged circuits connected in series to form domino logic, the conditional-invert logic being connected to an input line of at least one of said precharged circuits. In accordance with the present invention, it is possible for domino logic circuits comprising a plurality of precharged circuits to operate reliably, even when one of the precharged circuits has a conditional-invert function associated with it. In preferred embodiments, the conditional-invert logic is connected to an input line of the first precharged circuit in the domino logic.

BRIEF DESCRIPTION OF THE DRAWINGS

An embodiment of the invention will be described hereinafter, by way of example only, with reference to the accompanying drawings in which like reference signs are used for like features, and in which.

DESCRIPTION OF A PREFERRED EMBODIMENT

Figure 3:
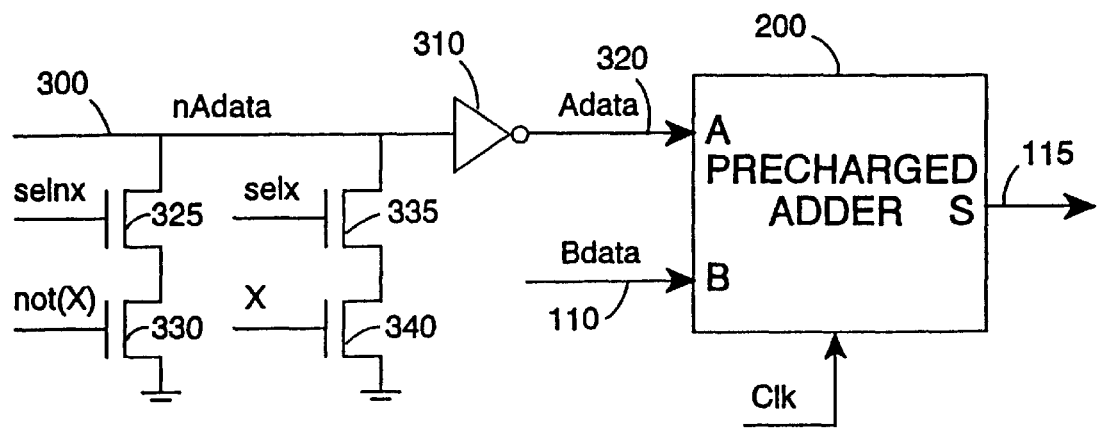
FIG. 3 illustrates a precharged adder circuit in accordance with the preferred embodiment of the present invention.

A preferred embodiment of the present invention will now be discussed with reference to FIG. 3, which shows a precharged adder circuit 200 with one of its inputs connected to a conditional-invert circuit in accordance with the preferred embodiment of the present invention. As illustrated in FIG. 3, the precharged adder 200 has two input terminals, A and B, these terminals being arranged to receive input data Adata and Bdata over lines 320 and 110, respectively. The data received at input terminals A and B is then used in an "add" operation performed within the precharged adder 200, with the result being output from terminal S over line 115. The precharged adder is arranged to receive as input data Adata either a data value X or the inverted data value, hereafter referred to as not(X). The precharged adder is in preferred embodiments in the precharge phase when the clock signal (Clk) has a logic "0" value, and in the active phase when Clk has a logic "1" value.

The conditional-invert logic comprises a first set of logic gates 335, 340, in preferred embodiments these logic gates being n-type transistors. The first n-type transistor 335 is arranged to receive a select signal, selx, and clearly will be turned on when selx has a logic "1" value and will not be turned on when selx has a logic "0" value.

The second n-type transistor 340 is arranged to receive the data value X, and again the transistor 340 will be turned on if X has a logic "1" value, and will not be turned on if X has a logic "0" value.

The conditional-invert circuit also includes a second set of logic gates 325, 330, which again in preferred embodiments are formed by n-type transistors. The first n-type transistor 325 receives a select signal which, in the active phase, is the inverse of the select signal, selx, provided to transistor 335. Hereinafter, this second select signal will be referred to as selnx. The second transistor 330 in the second set of logic gates is then arranged to receive the inverted data value, not(X), and will clearly be turned on if not(X) has a logic "1" value, and will not be turned on if not(X) has a logic "0" value.

In preferred embodiments, the precharged adder 200 is formed from n-type logic, since n-type logic is generally quicker than p-type logic. Hence, in the precharge phase, it is necessary for the two input lines 320 and 110, and the output line 115, to be precharged to a logic "0" level. To do this, the signal line 300 to which the two sets of logic gates 335, 340 and 325, 330 are connected is precharged to a logic "1" level by a pull-up transistor (not shown). To ensure that this precharging occurs correctly, both of the select signals selx and selnx have a logic "0" value during the precharge phase, thereby turning off transistors 325 and 335, and preventing the discharge of the signal line 300 to earth, irrespective of the values of X and not(X). The technique used in preferred embodiments to ensure both selx and selnx have a logic "0" value during the precharge phase will be described later with reference to FIG. 6.

As the signal line 300 is precharged to a logic "1" level, the inverter 310 will cause the first input line 320 to be precharged to a logic "0" level. Additionally, the input line 110 will also be pulled down to a logic "0" level. Further, as will be discussed in more detail later with reference to FIG. 4, internal precharging within the precharged adder 200 will cause the output line 115 to be precharged to a logic "0" level.

Once the precharge phase has been completed, then the precharged adder will enter the active phase, at which point either the select signal selx will go high in order to turn on the transistor 335, or the select selnx will go high to turn on the transistor 325. If the select signal selx goes high, then this will cause the data value X to be selected. In particular, if X is a logic "1" value, transistor 340 will be turned on, and this will cause the signal line 300 to be discharged to earth (or a logic "0" level), which will then cause the signal on the input line 320 to transition to a logic "1" level via the inverter 310 to thereby represent the data value X. Similarly, if the data value X has a logic "0" value, then the transistor 340 will remain turned off, the signal line 300 will remain in its precharged logic "1" level, and the signal on line 320 will remain at the logic "0" level, thereby again representing the logic value X.

In an analogous manner, if the select signal selnx goes high instead of the select signal selx, then the transistor 325 will be turned on, and the signal on input line 320 will then represent the inverted data value, not(X).

It should be noted that whilst the input lines 320 and 110 of the adder have been described as carrying single bit values to the inputs of the precharged adder 200, it is likely in preferred embodiments that the inputs to the adder will come from precharged buses, and that the output terminal S of the precharged adder 200 will likewise be connected to a precharged output bus. In such instances, the input lines 320, 110 and output line 115 illustrated in FIG. 3, and indeed the lines carrying signals X and not(X), can be thought of as representing one bus line of a bus. In this instance, each bus line of the bus connected to the input terminal A of the precharged adder 200 will have separate conditional-invert logic connected thereto. However, in preferred embodiments, the signals selx, selnx and clk will be common to all bus lines.

By the above described approach, it will be apparent that the precharged adder 200 can be used to perform both addition and subtraction, and the speed benefits associated with the use of a precharged adder as opposed to a non-precharged adder can be realised, without there being any need to introduce delay logic to compensate for any fluctuations that may occur when using prior art conditional-invert functions such as XOR gates. In particular, in accordance with the preferred embodiment of the present invention, the conditional-invert circuit is arranged such that, in the precharge phase, the input line 320 can reliably be precharged to the logic "0" level.

Figure 4:
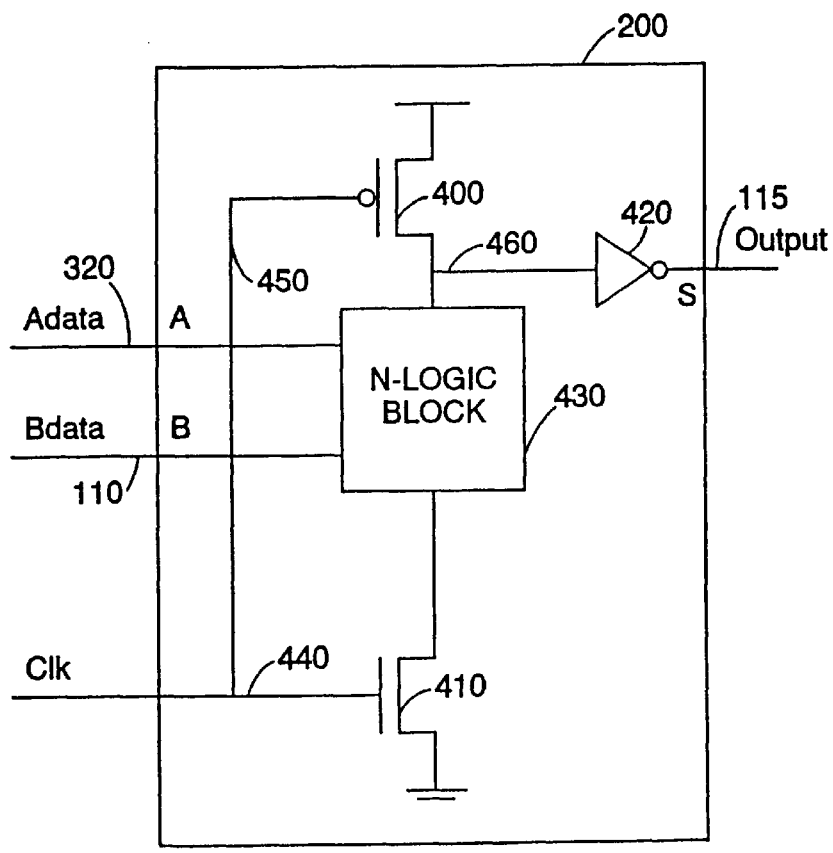
FIG. 4 illustrates the circuitry within a precharged circuit used to precharge he circuit in accordance with preferred embodiments of the present invention.

Having discussed the operation of a precharged adder circuit in accordance with preferred embodiments of the present invention with reference to FIG. 3, the manner in which such a precharged circuit is precharged in accordance with preferred embodiments will now be discussed with reference to FIG. 4. As illustrated in FIG. 4, the precharged adder circuit 200 includes an n-logic block 430 which consists of the various logic gates required to perform the "add" operation. Additionally, a p-type transistor 400 is connected between a reference voltage and an internal precharged line 460 of the precharged adder 200. Further, an n-type transistor 410 is connected between the bottom of the n-logic block 430 and earth.

A clock signal is then provided over paths 440 and 450 to the transistors 410 and 400, respectively. During the precharge phase, the clock has a logic "0" value, hence causing transistor 410 to turn off, and transistor 400 to turn on. This in turn causes the internal precharged line 460 to be pulled up by the transistor 400 to the reference voltage, thereby representing a logic "1" value. Since the transistor 410 is turned off during the precharge phase, the internal precharged line 460 cannot be shorted to earth via the n-logic block 430. Since the internal precharged line 460 is precharged to a logic "1" level, then this will cause the output line 115 to be precharged to a logic "0" level via the inverter 420.

When the precharge phase is exited, and the precharged adder circuit 200 is enabled, the clock signal goes high, causing the transistor 400 to turn off, and the transistor 410 to turn on. Further, the n-logic block 430 will conditionally discharge the precharged line 460 to earth, dependent on the values of Adata and Bdata on the input lines 320 and 110, respectively. If the n-logic block 430 discharges the internal precharged line 460 to earth, then the output line 115 will transition to a logic "1" value.

Whilst FIG. 4 shows the internal structure of the precharged adder circuit 200, the general structure is applicable to any precharged circuit, and the structure of the n-logic block 430 will change dependent on the function to be performed by the precharged circuit.

Figure 5:
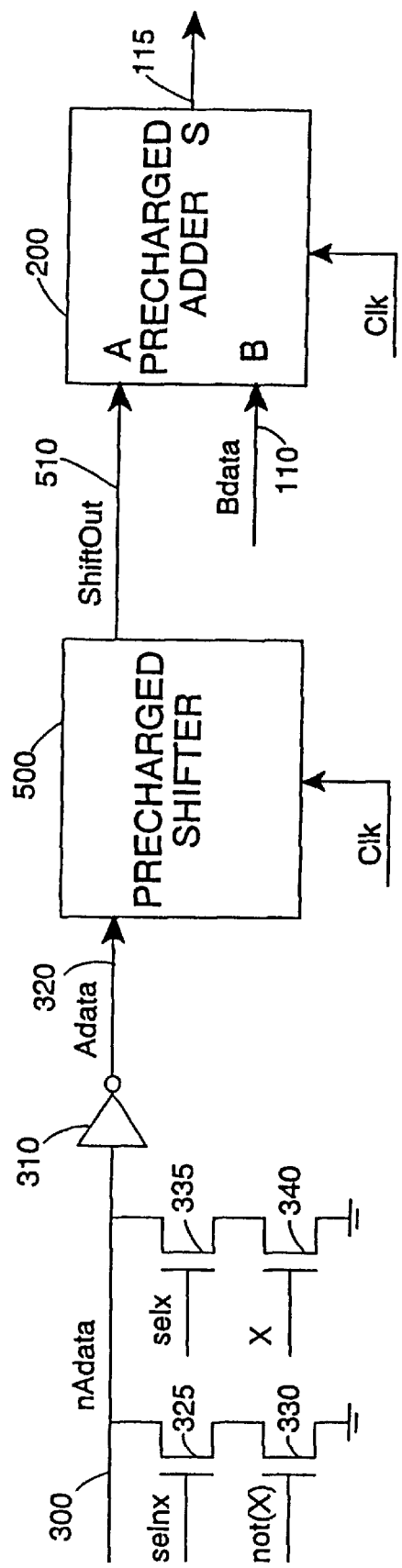
FIG. 5 illustrates a simple domino logic structure consisting of a precharged shifter and a precharged adder in accordance with the preferred embodiment of the present invention.

In accordance with preferred embodiments of the present invention, it is possible for a number of precharged circuits to be connected in series to form domino logic. A simple domino logic circuit is illustrated in FIG. 5. The conditional-invert logic is identical to that discussed earlier with reference to FIG. 3, but now the Adata signal on line 320 is the input to a barrel shifter circuit 500 instead of being input directly to the precharged adder 200. In this embodiment, it is the output of the barrel shifter 500 which is provided over line 510 to the input A of the precharged adder 200. During the precharge phase, the signal line 300 is precharged high, as is the internal precharged line of the shifter 500, thus causing both Adata on line 320 and ShiftOut on line 510 to be driven to a logic "0" value. As discussed earlier with reference to FIG. 4, the output line 115 from the precharged adder will also be driven to a logic "0" value during the precharge phase, as indeed will the value Bdata online 110.

At the start of the active phase, either selx or selnx will be driven high, thereby causing either the value X or not(X), respectively, to be passed on to input line 320 as the value Adata. This is then shifted by the barrel shifter, thus giving logic "0" to logic "1" transitions on the ShiftOut line 510. This in turn cleanly drives the precharged gates within the adder, resulting in a fast shift-and-add result.

With a conventional XOR gate, such an operation would need a very carefully designed self-timed path around the barrel shifter. In fact, given the amount of safety margin that would need to be built in to ensure correct operation under all conditions, it would probably be as fast to use a non-precharged adder in such a situation, since the delay introduced by the self-timed path would negate any benefit that might be obtained from using a precharged adder.

It will be appreciated that the complexity of the shifter is increased slightly in accordance with the embodiment of FIG. 5, since the polarity of the leading or trailing "0"s added by the shifter will have to be inverted if not(X) is selected, as will any shifter overflow (i.e. carry out) bits. This is due to the fact that, in accordance with the FIG. 5 embodiment, the XOR function implemented by the conditional-invert logic has been applied prior to the data being input to the shifter.

Figure 6:
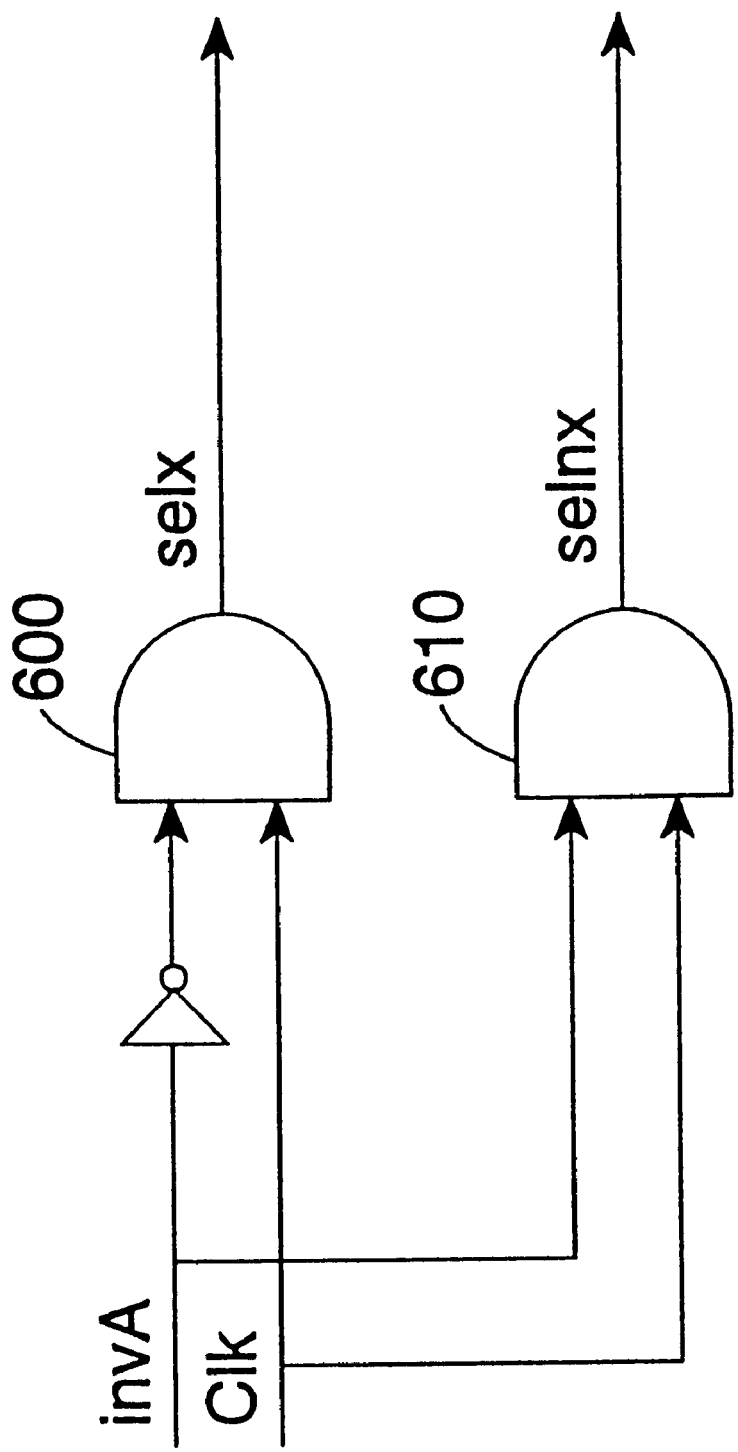
FIG. 6 illustrates how the selx and selnx signals are generated in preferred embodiments of the present invention.

When discussing FIG. 3 earlier, it was indicated that in the precharge phase, both selx and selnx have a logic "0" value, whilst in the active phase, they have complimentary values. The manner in which this is achieved in preferred embodiments is indicated in FIG. 6. As illustrated in FIG. 6 the signals selx and selnx are generated by the outputs of two AND gates 600 and 610, respectively. Both AND gates receive as one of their inputs the clock signal which is also passed to the precharged circuit(s) (see FIG. 4). During the precharge phase, the clock signal has a logic "0" value, and hence it is clear that the output of both AND gates 600 and 610 will be a logic "0" value.

However, in the active phase, the clock signal goes high, and hence the outputs of the AND gates 600 and 610 will depend on the state of their other input. AND gate 610 receives as its other input the value invA, this being the signal generated by the data processing circuit to indicate whether the data value X should be inverted. If invA has a logic "0" value, this indicates that the data value X should not be inverted, whereas if invA has a logic "1" value, this indicates that the data value X should be inverted. Hence, if invA has a logic "0" value, then the output from AND gate 610 will be in a logic "0" value. In contrast, the invA signal is inverted prior to being input to the AND gate 600, and hence a low invA signal will cause the output from AND gate 600 to be high. Hence, in this instance selx will be high, and selnx will be low, thereby causing the data value X to be selected. If, conversely, invA is high, then the output from AND gate 610 will be high, whilst the output from AND gate 600 will be low, thereby causing the value not(X) to be selected.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
   a precharged circuit having at least one input line arranged to be precharged to a first logic value during a precharge phase;
   a conditional-invert circuit connected to a first said at least one input line and arranged to provide a first data value or the inverted first data value on the first input line during an active phase following the precharge phase, said conditional-invert circuit comprising:
   a signal line coupled to the first input line and arranged to be precharged to a predetermined logic value during the precharge phase;
   a first set of logic gates connected between the signal line and a predetermined voltage, and being arranged dependent on a value of a first select signal to cause the first data value to be provided on the first input line;
   a second set of logic gates connected between the signal line and the predetermined voltage, and being arranged dependent upon a value of a second select signal to cause the inverted first data value to be provided on the first input line;
   whereby in the active phase, the values of said first and second select signals cause only one of said first and second sets of logic gates to provide its respective data value to said input line.

2. A data processing apparatus as claimed in claim 1, wherein each set of logic gates comprises two or more logic gates connected in series between the signal line and the predetermined voltage.

3. A data processing apparatus as claimed in claim 2, wherein a first logic gate in said first set is arranged to be turned on upon receipt of the first select signal in order to cause the first data value to be provided on the first input line.

4. A data processing apparatus as claimed in claim 3, wherein a second logic gate in said first set is arranged to receive the first data value, and to be turned on dependent on the value of said first data value.

5. A data processing apparatus as claimed in claim 2, wherein a first logic gate in said second set is arranged to be turned on upon receipt of the second select signal in order to cause the inverted first data value to be provided on the first input line.

6. A data processing apparatus as claimed in claim 5, wherein a second logic gate in said second set is arranged to receive the inverted first data value, and to be turned on dependent on the value of said inverted first data value.

7. A data processing apparatus as claimed in claim 1, wherein the first logic value to which the at least one input line of the precharged circuit is precharged is a logic '0' value.

8. A data processing apparatus as claimed in claim 1, wherein the logic gates in said first and second set are n-type logic gates.

9. A data processing apparatus as claimed in claim 7, wherein the logic gates in said first and second set are n-type logic gates, and wherein the predetermined voltage to which the first and second sets of logic gates are connected is earth, and the signal line is precharged to a logic '1' value, the signal line being coupled to the first input line via an inverter.

10. A data processing apparatus as claimed in claim 1, wherein the precharged circuit is an adder circuit.

11. A data processing apparatus as claimed in claim 10, wherein the adder circuit has said first input line and a second input line.

12. A data processing apparatus as claimed in claim 11, further comprising a second conditional-invert circuit connected to the second input line.

13. A data processing apparatus as claimed in claim 1, further comprising a plurality of precharged circuits connected in series to form domino logic, the conditional-invert logic being connected to an input line of at least one of said precharged circuits.

14. A data processing apparatus as claimed in claim 13, wherein the conditional-invert logic is connected to an input line of the first precharged circuit in the domino logic.

15. A data processing apparatus as claimed in claim 1, wherein at least during the active phase said first select signal is the invert of said second select signal.

* * * * *

UNITED STATES PATENT AND TRADEMARK OFFICE
CERTIFICATE OF CORRECTION

PATENT NO. : 6,140,843
DATED : October 31, 2000
INVENTOR(S) : Howard

Figure 1:
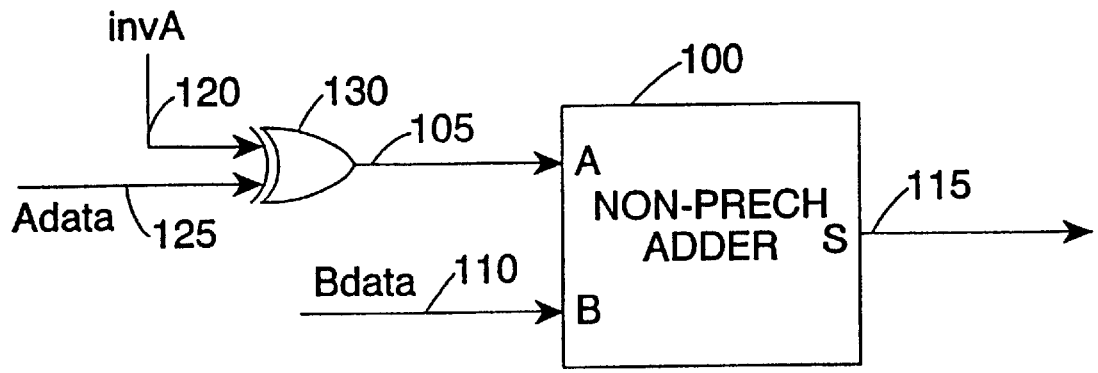
FIG. 1 is a block diagram illustrating an adder circuit according to a first prior art technique.
Figure 2:
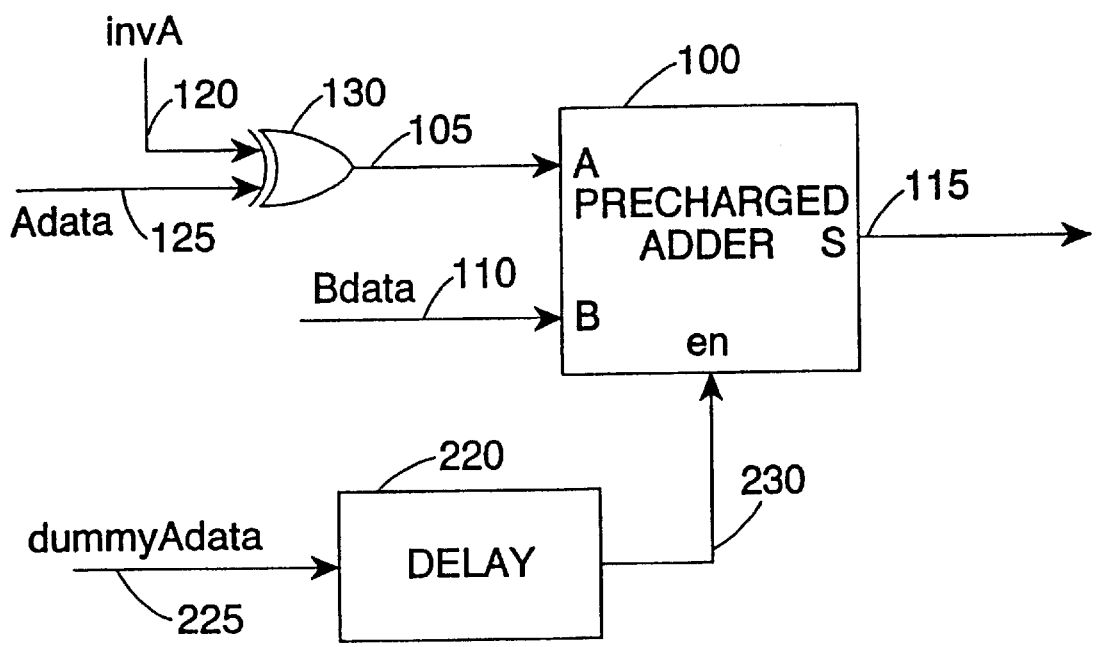
FIG. 2 is a block diagram illustrating an adder circuit according to a second prior art technique.

It is certified that error appears in the above-identified patent and that said Letters Patent is hereby corrected as shown below:

Drawings,
Fig. 2, reference numeral "100" should read -- 200 --.

Signed and Sealed this

Sixteenth Day of April, 2002

Attest:

JAMES E. ROGAN
*Director of the United States Patent and Trademark Office*

*Attesting Officer*